United States Patent
Buckland et al.

(10) Patent No.: US 6,665,753 B1
(45) Date of Patent: Dec. 16, 2003

(54) PERFORMANCE ENHANCEMENT IMPLEMENTATION THROUGH BUFFER MANAGEMENT/BRIDGE SETTINGS

(75) Inventors: Pat Allen Buckland, Austin, TX (US); Michael Anthony Perez, Cedar Park, TX (US); Kiet Anh Tran, Cedar Park, TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 09/637,317

(22) Filed: Aug. 10, 2000

(51) Int. Cl.7 .................................................. G06F 3/00
(52) U.S. Cl. ............................ 710/52; 710/36; 710/54; 710/65; 709/24
(58) Field of Search ................................. 710/1, 310, 2, 710/10, 19, 23, 22, 54, 27, 101, 107, 129, 36, 52, 56, 65; 709/250, 212, 246; 711/151

(56) References Cited

U.S. PATENT DOCUMENTS

| | | | | |
|---|---|---|---|---|
| 5,983,292 A | * | 11/1999 | Nordstrom et al. | 710/54 |
| 6,023,736 A | * | 2/2000 | Lambeth et al. | 710/10 |
| 6,078,970 A | * | 6/2000 | Nordstrom et al. | 710/19 |
| 6,081,851 A | * | 6/2000 | Futral et al. | 710/23 |
| 6,101,557 A | * | 8/2000 | Movall et al. | 710/2 |
| 6,223,299 B1 | * | 4/2001 | Bossen et al. | 714/4 |
| 6,477,610 B1 | * | 11/2002 | Willenborg | 710/310 |

* cited by examiner

Primary Examiner—Jeffrey Gaffin
Assistant Examiner—Rijue Mai
(74) Attorney, Agent, or Firm—Duke W. Yee; Mark E. McBurney; Wayne P. Bailey

(57) ABSTRACT

A method, system, and apparatus for modifying bridges within a data processing system to provide improved performance is provided. In one embodiment, the data processing system determines the number of input/output adapters connected underneath each PCI host bridge. The data processing system also determines the type of each input/output adapter. The size and number of buffers within the PCI host bridge is then modified based on the number of adapters beneath it as well as the type of adapters beneath it to improve data throughput performance as well as prevent thrashing of data. The PCI host bridge is also modified to give load and store operations priority over DMA operations. Each PCI-to-PCI bridge is modified based on the type of adapter connected to it such that the PCI-to-PCI bridge prefetches only an amount of data consistent with the type of adapter such that excess data is not thrashed, thus requiring extensive repetitive use of the system buses to retrieve the same data more than once.

29 Claims, 3 Drawing Sheets

PERFORMANCE ENHANCEMENT IMPLEMENTATION THROUGH BUFFER MANAGEMENT/BRIDGE SETTINGS

BACKGROUND OF THE INVENTION

1. Technical Field

The present invention relates to an improved data processing system and, more particularly, to methods of managing bus traffic generated by I/O devices.

2. Description of Related Art

With the recent rapid expansion of the Internet as well as the increased use of networked computers by small, as well as large, businesses, the numbers of computers utilized as servers has increased. Servers is a computer within a network that is shared by multiple users. Servers may be used, for example, as a file server in a small network allowing access to common files to multiple users within a company, or as a web server providing internet content to numerous users who access the information via the Internet.

Because servers may be accessed by numerous users, servers typically include many input/output (I/O) devices to accommodate these users. In many computers, these I/O devices are connected to a central processor and other system resources within the computer via an I/O adapter connected to a peripheral component interconnect (PCI) bus. The PCI bus is connected to a main system I/O bus via PCI-PCI bridges and PCI host bridges. These bridges include circuitry for placing data from the PCI bus onto the system I/O bus and vice versa. The system I/O bus is shared by numerous I/O adapters to carry data between various system resources, such as, for example, the central processing unit (CPU) or main system memory, and the various I/O devices. However, only one I/O device at a time may utilize the system I/O bus. Therefore, other devices must wait until the system I/O bus is not busy to utilize the system I/O bus.

When data is requested by an I/O device, a PCI to PCI bridge prefetches a certain amount of the requested data to provide for the I/O adapter's buffers. Once this data has been provided to the I/O adapter, the next part of the requested data is prefetched. The amount of data prefetched by the PCI to PCI bridge is fixed and independent of the type of I/O adapter. If the adapter has shallow buffers and the PCI to PCI bridge prefetches more data than the adapter can take in due to insufficient adapter buffer space, then the PCI to PCI bridge is forced to throw away the extra data to avoid coherency issues. Then the adapter may ask for the additional data and the PCI to PCI bridge will have to re-request the data from the PCI Host Bridge (PHB). The PHB may already have the next available piece of data, which it will have to throw away to re-gather the previous data again.

For example, if a PCI to PCI bridge prefetches 512 bytes of data, then the PHB will give the PCI to PCI bridge the 512 bytes of data and then gather another 512 bytes of data in anticipation of a request for the next piece of data. The PCI to PCI bridge gives the data to the adapter, but the adapter only takes 128 bytes because that is the limit of its buffer. The PCI to PCI bridge throws away 384 bytes. The adapter then requests the next 128 bytes of data. The PCI to PCI bridge must then go back to the PHB to request the previous data again. Thus, the PHB has to throw away the next 512 bytes so that it can retrieve the previous data again.

This fetching data over and over again generates a great deal of wasted traffic on the system I/O bus thus slowing down the performance of the server. Therefore, a method, system, and apparatus for reducing the amount of traffic on the system I/O bus due to multiple requests of the same data by an I/O adapter would be desirable.

SUMMARY OF THE INVENTION

The present invention provides a method, system, and apparatus for modifying bridges within a data processing system to provide improved performance. In one embodiment, the data processing system determines the number of input/output adapters connected underneath each PCI host bridge. The data processing system also determines the type of each input/output adapter. The size and number of buffers within the PCI host bridge is then modified based on the number of adapters beneath it as well as the type of adapters beneath it to improve data throughput performance as well as prevent trashing of data. The PCI host bridge is also modified to give load and store operations priority over DMA operations. Each PCI-to-PCI bridge is modified based on the type of adapter connected to it such that the PCI-to-PCI bridge prefetches only an amount of data consistent with the type of adapter such that excess data is not trashed, thus requiring extensive repetitive use of the system buses to retrieve the same data more than once.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
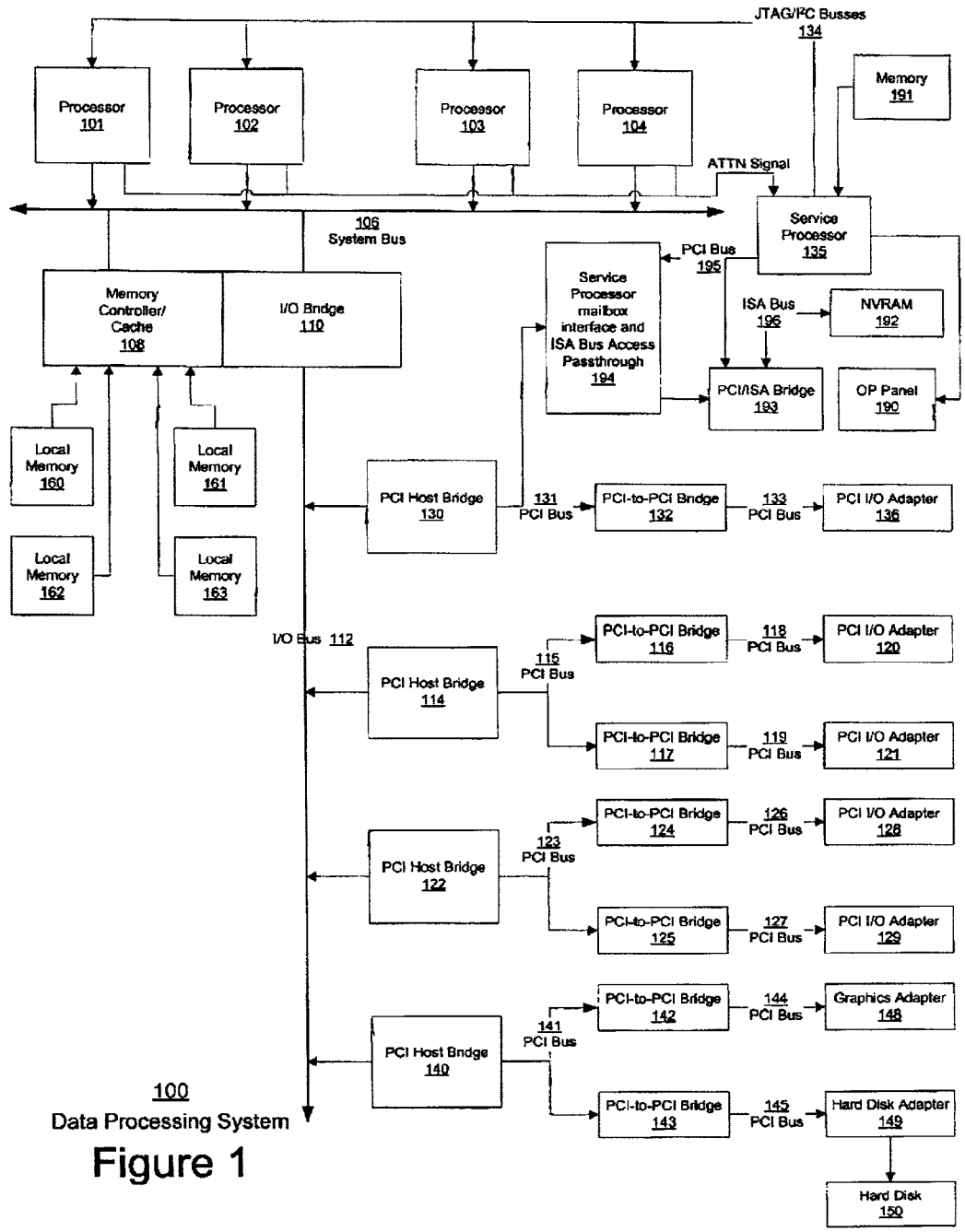
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted. An operating system, such as, for example, the Advanced Interactive Executive (AIX) operating system, a product of the International Business Machines Corporation of Armonk, N.Y., may run on data processing system 100.

Peripheral component interconnect (PCI) Host bridge 114 connected to I/O bus 112 provides an interface to PCI local bus 115. A number of Input/Output adapters 120–121 may be connected to PCI bus 115 through a respective one of PCI-to-PCI bridges 116–117 via a respective one of PCI buses 118–119. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI-to-PCI bridges 124–125 which are in turn each connected to a respective one of PCI I/O adapters 128–129 by a respective one of PCI buses 126–127. Thus, additional I/O devices, such as, for example, modems or network adapters may be supported through each of PCI I/O adapters 128–129. In this manner, data processing system 100 allows connections to multiple network computers. Each of PCI-to-PCI bridges 116–117, 124–125, 142–143, and 132 is connected to a single I/O adapter.

A memory mapped graphics adapter 148 may be connected to I/O bus 112 through PCI Host Bridge 140 and PCI-to-PCI Bridge 142 via PCI buses 141 and 144 as depicted. A hard disk 150 may also be connected to I/O bus 112 through PCI Host Bridge 140 and PCI-to-PCI Bridge 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access passthrough logic 194 and PCI-to-PCI Bridge 132. The ISA bus access passthrough logic 194 forwards PCI accesses destined to the PCI/ISA bridge 193. The NV-RAM storage is connected to the ISA bus 196. The Service processor 135 is coupled to the service processor mailbox interface 194 through its local PCI bus 195.

Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. Service processor 135 is responsible for saving and reporting error information related to all the monitored items in data processing system 100. Service processor 135 also takes action based on the type of errors and defined thresholds.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
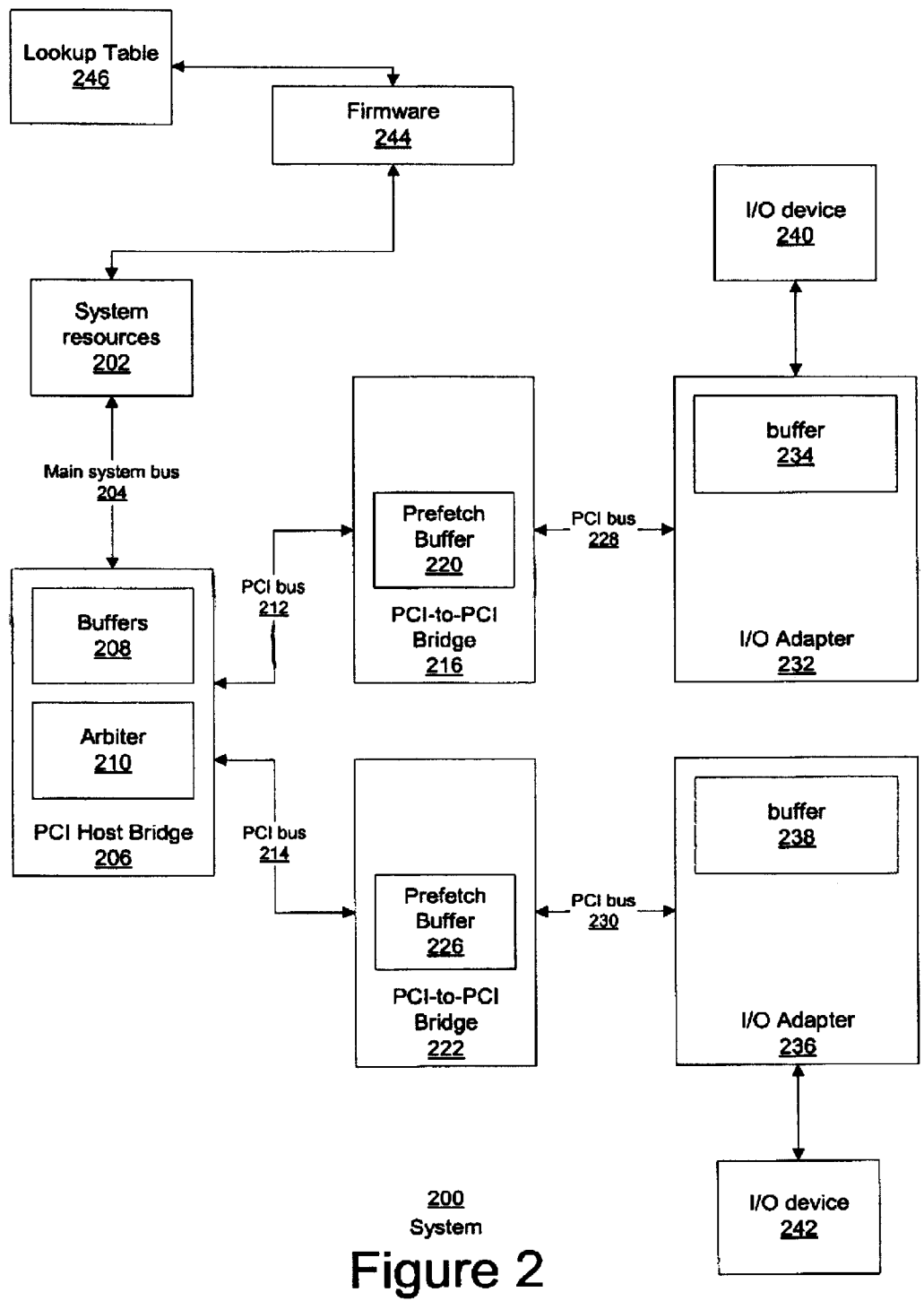
FIG. 2 depicts a block diagram illustrating PCI host bridge and PCI-to-PCI bridge system in accordance with the present invention.

With reference now to FIG. 2, a block diagram illustrating PCI host bridge and PCI-to-PCI bridge system is depicted in accordance with the present invention. System 200 may be implemented as data processing system 100 in FIG. 1. System 200 shows, in greater detail, the functioning of a PCI host bridge, PCI-to-PCI bridge, and I/O adapter system within a data processing system, such as, for example, data processing system 100 in FIG. 1.

System 200 includes PCI Host Bridge 206, PCI-to-PCI bridges 216 and 222, I/O adapters 232 and 236, I/O devices 240–242, firmware 244, and system resources 202. System resources may include a processing unit and system memory as well as other resources that may be found in a data processing system. PCI Host Bridge 206 is connected to system resources 202 through main system bus 204. PCI Host Bridge 206 is connected to each of PCI-to-PCI bridges 216 and 222 through a respective one of PCI buses 212–214. Each of PCI-to-PCI bridges 216 and 222 is connected to a respective one of I/O adapters 232 and 236 through a respective one of PCI buses 228–230. Each of I/O adapters 232 and 236 is connected to a respective one of I/O devices 240–242.

During initialization of system 200 and during hotplugging where an adapter is added to system 200 at runtime due to a hotplug command, firmware 244 interrogates each of I/O adapters 232 and 236 to determine the adapter ID of each of I/O adapters 232 and 236. Firmware 244 then compares the adapter IDs to values in lookup table 246 to determine what settings to use for each of I/O adapters 232 and 236. If the adapter ID of one or both of I/O adapters 232 and 236 does not match values contained within lookup table 246, then default values are used for the ones of I/O adapters 232 and 236 not found in lookup table 246. Firmware 244 will also determine the number of slots (i.e. I/O adapters) beneath PCI Host Bridge 206.

Firmware 244 will then reprogram PCI Host Bridge 206 and PCI-to-PCI Bridges 216 and 222 to optimize the performance of system 200. Based on the number of slots beneath PCI Host Bridge 206, PCI Host Bridge 206 will be reprogrammed such that buffers 208 will be divided into additional read buffers if there are more than four slots beneath it. The additional read buffers are available by reducing the size of each buffer. The number and size of the read buffers are determined by both the number of adapters beneath the PCI Host Bridge as well as the type of adapters present in the slots.

In the depicted embodiment, three choices for the number and size of the buffers are presented in lookup table 246 to firmware 244: 7 channels×512 byte buffer, 3 channel×1024 byte buffer, or 15 channel×256 byte buffer. In future chips, however, the chip may have, for example, the same number of channels, but the size of the buffers may be different, for example, the buffer size may be doubled, or the chip may have a different number of channels and/or a different buffer size. In the depicted example, the firmware 244 chooses between 7 or 15 channels since 3×1024 does not provide any improvements. In this two slot design, with the three choices, the firmware 244 chooses 7×512 (7 channels, 512 bytes each). If, rather than a two slot design, a 10 slot design is chosen, then the firmware 244 would choose the 15 channel by 256 byte buffer size over the 7 channel by 512 byte buffer size.

In other implementations, there may be other choices of buffer size and channel number. In whatever implementation is chosen, ideally, it is desirable to have at least one buffer per IOA. However, two buffers per IOA are better.

If the firmware 244 has unlimited control over the number of buffers and buffer size, an equation is provided for firmware to use to determine the number of channels and the buffer size. If the firmware 244 has limited choices, as in the depicted example, the firmware 244 decision is based on a lookup table 246.

PCI Host Bridge 206 also contains an arbiter 210 that determines which of two operations requesting access to one of buses 204, and 212–214 may have access next. This arbiter 210 is also reprogrammed by firmware 244 such that load and store operations have priority over direct memory access (DMA) operations. DMA operations are operations in which data is transferred directly between two devices, such as, for example, I/O devices connected to each of I/O adapters 232 and 236, directly without the intervention of the processor.

Firmware 244 also reprograms each of PCI-to-PCI Bridges 216 and 222 depending on the type of I/O adapter beneath each. If a high speed deep buffer 234, 238 adapter 232, 236 is plugged in, then the PCI-to-PCI bridge 216, 222 will prefetch the maximum amount of data allowed. This maximum amount of data is limited only by the size of the buffer 220, 226 within PCI-to-PCI bridge 216, 222, the size of the respective buffer within buffers 208, and/or by other system 200 constraints, but not by the buffer 232, 236 within the I/O adapter 232, 236. If the adapter 232, 236 has shallow buffers 234, 238 and is a slow adapter, then the PCI-to-PCI bridge 216, 222 will be reprogrammed to only prefetch a small optimal amount of data consistent with the size of the buffer 234, 238 within and the speed of the I/O adapter 232, 236. This is done to prevent thrashing (i.e. throwing away data) and unnecessary traffic on the system bus 204 where the total system throughput is at stake. The modification of PCI-to-PCI bridges 216 and 222 may take into account such factors as, for example, read prefetching for each of the three read types, write combining sizes where write data is gathered and sent versus sending small packets, timer settings, and memory ranges.

In another embodiment of the present invention, rather than modifying the PCI Host Bridges and PCI-to-PCI Bridges only at initialization of the system and during hotplugging of an adapter, the various PCI Host Bridges and PCI-to-PCI Bridges may be modified and adjusted based on current activities of the system. For example, the system could sample what the adapter is requesting and using and, then, reprogram the prefetching mechanisms of the PCI Host Bridge and/or PCI-to-PCI Bridge to optimize performance. Buffer space may also be shared between PCI-to-PCI bridges based on the current activity loads within each bridge such that unneeded buffer space within one PCI-to-PCI bridge may be utilized by a different PCI-to-PCI bridge that needs additional buffer space for a particular activity. However, such sharing of buffer space assumes that both PCI-to-PCI bridges reside in the same physical chip.

Those of ordinary skill in the art will appreciate that the hardware depicted in FIG. 2 may vary. For example, more PCI Host Bridges than depicted may be utilized. Furthermore, more than two PCI-to-PCI Bridges may be connected to each PCI Host Bridge. However, each additional PCI-to-PCI bridge should only be connected to a single I/O adapter, similar to the PCI-to-PCI bridges depicted in FIG. 2. The depicted example is not meant to imply architectural limitations with respect to the present invention.

Figure 3:
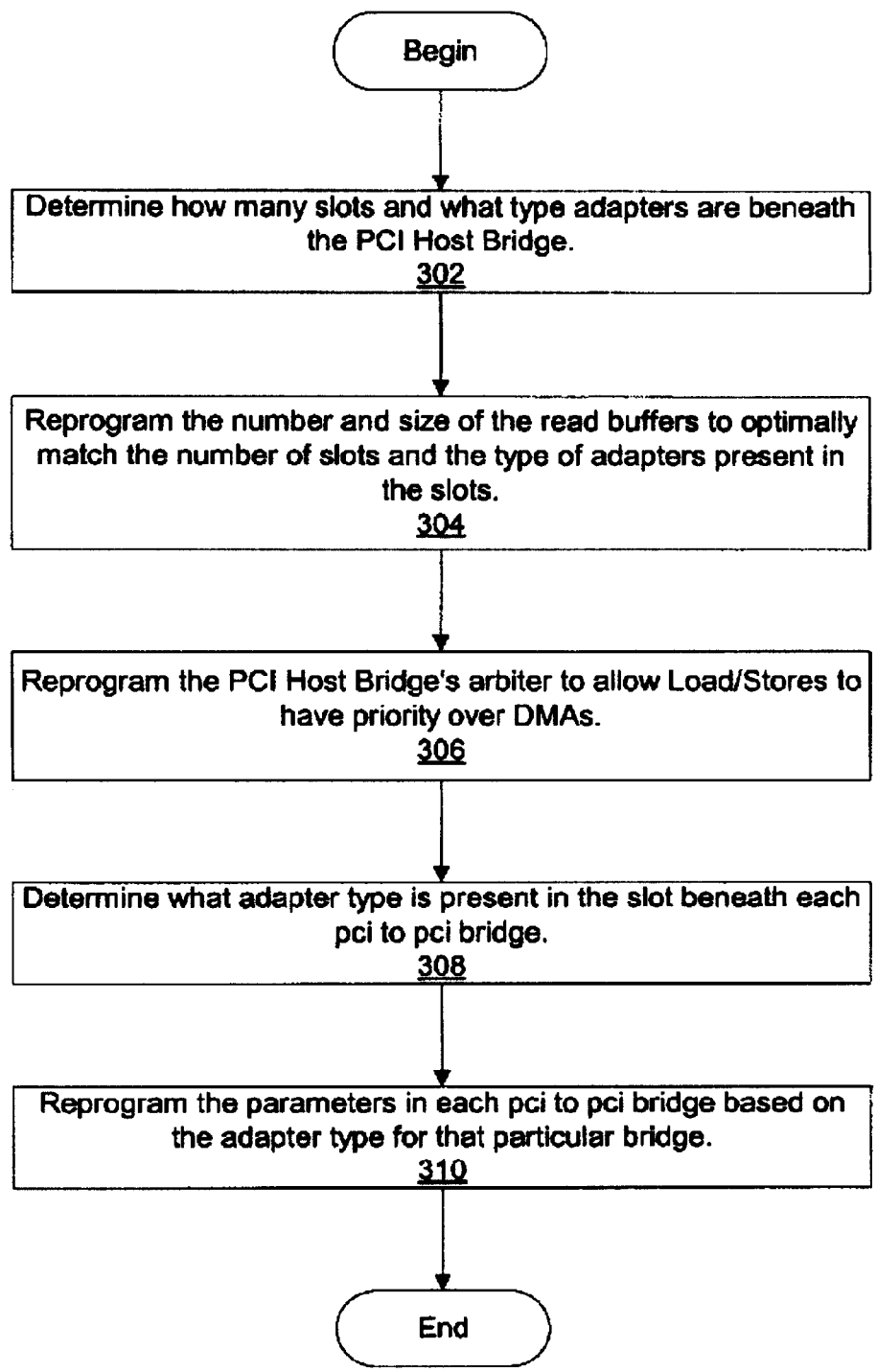
FIG. 3 depicts a flowchart illustrating an exemplary method of modifying PCI bridges to optimize performance of a data processing system in accordance with the present invention.

With reference now to FIG. 3, a flowchart illustrating an exemplary method of modifying PCI bridges to optimize performance of a data processing system is depicted in accordance with the present invention. To begin, the data processing system determines how many slots (i.e. adapters) and what type adapters are beneath each PCI Host Bridge (step 302). Each PCI Host Bridge is then reprogrammed such that the number and size of the read buffers optimally match the number of slots and the type of adapters present in the slots (step 304). Each PCI Host Bridge's arbiter is also reprogrammed to allow load and store operations to have priority over direct memory access (DMA) operations (step 306).

For each PCI-to-PCI bridge, the system determines what adapter type is present in the slot for the corresponding one of the PCI-to-PCI bridges (step 308). The parameters within each PCI-to-PCI bridge are then reprogrammed based on the adapter type of the adapter beneath that PCI-to-PCI bridge (step 310). Thus, for example, if the adapter's buffer holds a maximum of 128 bytes of data, then the PCI-to-PCI bridge is reprogrammed to prefetch only 128 bytes of data for read operations rather than some larger amount of data that the PCI-to-PCI bridge would otherwise prefetch for read operations requested by the I/O device connected to the adapter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying bridges within a data processing system to provide improved performance, the method comprising:

determining a number of input/output adapters connected to a host bridge;

determining a type of each input/output adapter connected to the host bridge; and modifying the size and number of buffers within the host bridge to match the number of input/output adapters and to match the type of each input/output adapter.

2. A method for modifying bridges within a data processing system to provide improved performance, the method comprising:

determining a number of input/output adapters connected to a host bridge;

determining a type of each input/output adapter connected to the host bridge;

modifying the size and number of buffers within the host bridge to match the number of input/output adapters and to match the type of each input/output adapter; and modifying an intermediary bridge between the host bridge and an individual one of the input/output adapters such that, during read operations, the intermediary bridge prefetches an amount of data no greater than the size of a buffer within the individual one of the input/output adapters.

3. The method as recited in claim 1, further comprising:

modifying the host bridge such that load and store operations are given priority over direct memory access operations whenever a conflict between operations exists.

4. The method as recited in claim 1, wherein the host bridge is a peripheral component interconnect host bridge.

5. The method as recited in claim 2, wherein the intermediary bridge is a peripheral component interconnect to peripheral component interconnect bridge.

6. The method as recited in claim 1, wherein the method is performed during initialization of the data processing system.

7. The method as recited in claim 1, wherein the method is performed during runtime responsive to a determination that an input/output adapter has been hotplugged into the data processing system.

8. The method as recited in claim 1, further comprising:

determining an activity of each input/output adapter; and modifying the host bridge and intermediary bridges based on the activity to improve performance.

9. A computer program product in a computer readable media for use in a data processing system for modifying bridges within the data processing system to provide improved performance, the computer program product comprising:

first instructions for determining a number of input/output adapters connected to a host bridge;

second instructions for determining a type of each input/output adapter connected to the host bridge; and third instructions for modifying the size and number of buffers within the host bridge to match the number of input/output adapters and to match the type of each input/output adapter.

10. A computer program product in a computer readable media for use in a data processing system for modifying bridges within the data processing system to provide improved performance, the computer program product comprising:

first instructions for determining a number of input/output adapters connected to a host bridge;

second instructions for determining a type of each input/output adapter connected to the host bridge;

third instructions for modifying the size and number of buffers within the host bridge to match the number of input/output adapters and to match the type of each input/output adapter; and fourth instructions for modifying an intermediary bridge between the host bridge and an individual one of the input/output adapters such that, during read operations, the intermediary bridge prefetches an amount of data no greater than the size of a buffer within the individual one of the input/output adapters.

11. The computer program product as recited in claim 9, further comprising:

fourth instructions for modifying the host bridge such that load and store operations are given priority over direct memory access operations whenever a conflict between operations exists.

12. The computer program product as recited in claim 9, wherein the host bridge is a peripheral component interconnect host bridge.

13. The computer program product as recited in claim 10, wherein the intermediary bridge is a peripheral component interconnect to peripheral component interconnect bridge.

14. The computer program product as recited in claim 9, wherein the computer program product is performed during initialization of the data processing system.

15. The computer program product as recited in claim 9, wherein the computer program product is performed during runtime responsive to a determination that an input/output adapter has been hotplugged into the data processing system.

16. The computer program product as recited in claim 9, further comprising:

fourth instructions for determining an activity of each input/output adapter; and fifth instructions for modifying the host bridge and intermediary bridges based on the activity to improve performance.

17. A system for modifying bridges within a data processing system to provide improved performance, the system comprising:

first means for determining a number of input/output adapters connected to a host bridge;

second means for determining a type of each input/output adapter connected to the host bridge; and third means for modifying the size and number of buffers within the host bridge to match the number of input/output adapters and to match the type of each input/output adapter.

18. A system for modifying bridges within a data processing system to provide improved performance, the system comprising:

first means for determining a number of input/output adapters connected to a host bridge;

second means for determining a type of each input/output adapter connected to the host bridge; p1 third means for modifying the size and number of buffers within the host bridge to match the number of input/output adapters and to match the type of each input/output adapter; and fourth means for modifying an intermediary bridge between the host bridge and an individual one of the input/output adapters such that, during read operations, the intermediary bridge prefetches an amount of data no greater than the size of a buffer within the individual one of the input/output adapters.

19. The system as recited in claim 17, further comprising:

fourth means for modifying the host bridge such that load and store operations are given priority over direct memory access operations whenever a conflict between operations exists.

20. The system as recited in claim 17, wherein the host bridge is a peripheral component interconnect host bridge.

21. The system as recited in claim 18, wherein the intermediary bridge is a peripheral component interconnect to peripheral component interconnect bridge.

22. The system as recited in claim 17, wherein the system is performed during initialization of the data processing system.

23. The system as recited in claim 17, wherein the system is performed during runtime responsive to a determination that an input/output adapter has been hotplugged into the data processing system.

24. The system as recited in claim 17, further comprising:

fourth means for determining an activity of each input/output adapter; and fifth means for modifying the host bridge and intermediary bridges based on the activity to improve performance.

25. A bridge for use in a data processing system, the bridge comprising:

a first input/output connection for coupling the bridge to a first bus, wherein the first bus provides a connection to the data processing system;

a second input/output connection for coupling the bridge to a second bus, wherein the second bus provides a connection to an input/output adapter; and a buffer for storing prefetched data prior to sending the prefetched data to the input/output adapter;

wherein the bridge is configured to prefetch an amount of data based on the identity of the type of input/output adapter connected to the bridge via the second bus.

26. The bridge as recited in claim 25, wherein the bridge is a peripheral component interconnect to peripheral component interconnect bridge.

27. A host bridge for use in a data processing system; the host bridge comprising:

a plurality of first input/output connections for coupling a plurality of bridges to the host bridge;

a second input/output connection for coupling the host bridge to the data processing system; and a plurality of buffers for storing prefetched data prior to sending the prefetched data to an input/output adapter coupled to one of the plurality of bridges;

wherein the number and size of the buffers is configured in response to a determination of the number and type of input/output adapters coupled to the host bridge through the plurality of bridges.

28. The host bridge as recited in claim 27, further comprising:

an arbiter configured to provide load and store operations priority over direct memory access processes whenever a conflict arises over access to buses between the two operations.

29. The host bridge as recited in claim 27, wherein the host bridge is a peripheral component interconnect host bridge.

* * * * *

UNITED STATES PATENT AND TRADEMARK OFFICE
CERTIFICATE OF CORRECTION

PATENT NO. : 6,665,753 B1
DATED : December 16, 2003
INVENTOR(S) : Buckland et al.

It is certified that error appears in the above-identified patent and that said Letters Patent is hereby corrected as shown below:

Column 8,
Line 28, after "host bridge;" delete "p1" and begin a new paragraph with "third means".

Signed and Sealed this

Twentieth Day of December, 2005

JON W. DUDAS
*Director of the United States Patent and Trademark Office*